United States Patent
Lejeune

[15] 3,683,479
[45] Aug. 15, 1972

[54] METHOD OF MAKING WHEELS FOR HEAVY VEHICLES

[72] Inventor: Daniel Lejeune, Clermont-Ferrand, France

[73] Assignee: Compagnie Generale des Etablissements Michelin, vaison Sociale Michelin a Cie, Clermont-Ferrand (Puy-de-Dome), France

[22] Filed: Nov. 13, 1970

[21] Appl. No.: 89,281

[30] Foreign Application Priority Data

Nov. 15, 1969 France......................6939405

[52] U.S. Cl..................29/159.01, 29/558, 301/63 R
[51] Int. Cl...........................B21h 1/02, B21k 1/32
[58] Field of Search....29/159.01, 159 R, 159.1, 558, 29/407; 301/63 R

[56] References Cited

UNITED STATES PATENTS

| 3,222,765 | 12/1965 | Parent et al. | 29/159.1 |
| 3,530,717 | 9/1970 | Gregg | 29/159.1 X |
| 3,580,043 | 5/1971 | Gollwitzer | 29/159.1 X |
| 3,581,550 | 6/1971 | Waterbury | 29/159.1 X |

*Primary Examiner*—John F. Campbell
*Assistant Examiner*—Victor A. Dipalma
*Attorney*—Brumbaugh, Graves, Donohue & Raymond

[57] ABSTRACT

A wheel for heavy vehicles has a rim formed with a well base and a conical bead seat on either side of the well base. A disc is assembled with the rim in such a manner that a reference plane and a reference bore physically formed on the rim are respectively parallel to and coaxial with the middle circle of the rim-- defined as the intersection of the rim and the plane of intersection of the conical surfaces of the bead seats.

4 Claims, 6 Drawing Figures

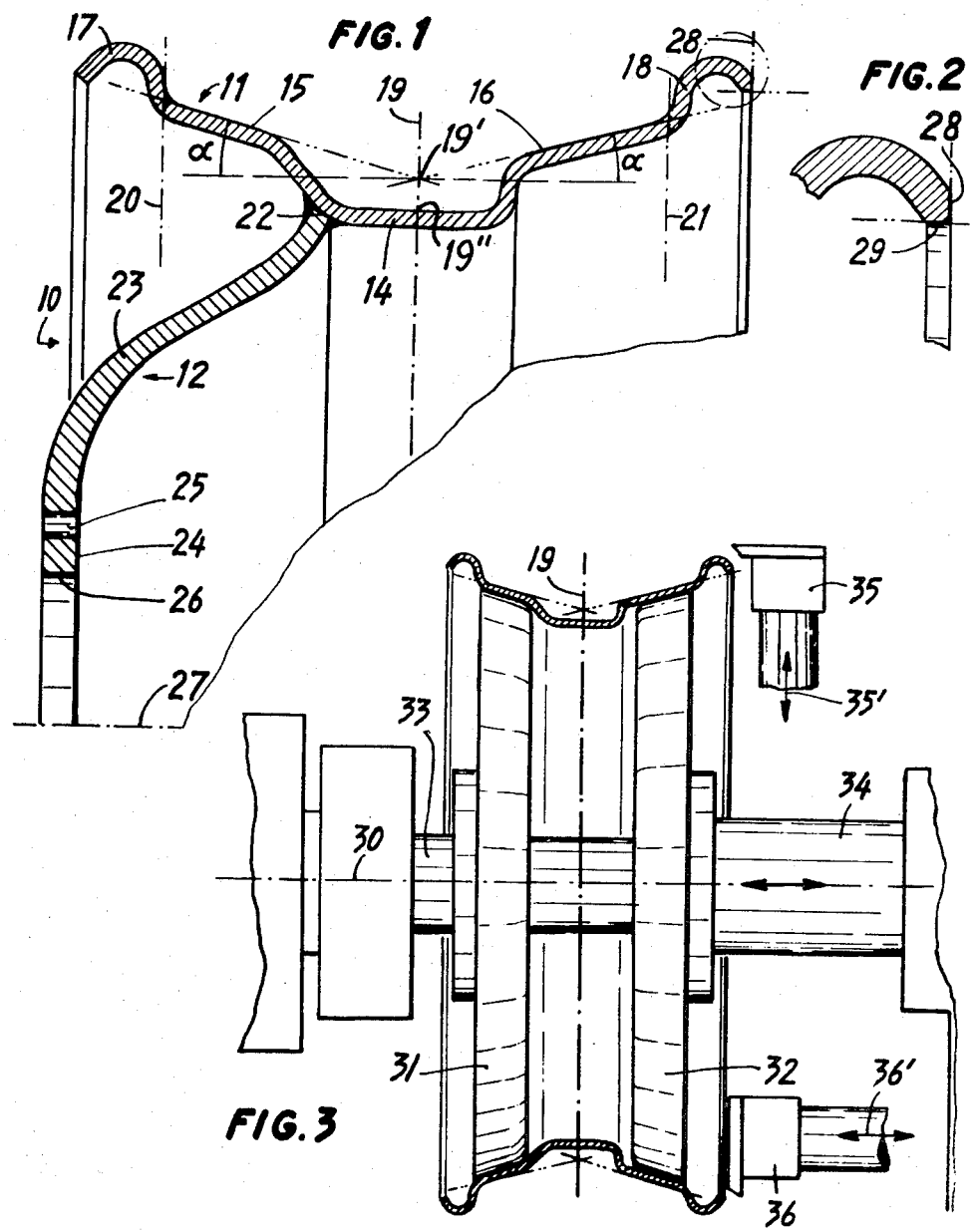

METHOD OF MAKING WHEELS FOR HEAVY VEHICLES

BACKGROUND OF THE INVENTION

This invention relates to the manufacture of wheels intended to be equipped with pneumatic tires and to the wheels per se. More particularly it relates to wheels having a well-base rim (also known as a drop-center rim) and conical bead seats intended to equip vehicles of the heavy-duty type (trucks, buses, etc.).

The manufacture of a wheel comprises essentially two stages. In the first stage a rim and a disc are produced; in a second stage they are assembled, generally by welding. In the case of wheels for "heavy vehicles" having a well-base rim and conical seats, it is known how to produce the rims and the discs with satisfactory precision and at acceptable cost. On the other hand, the problem of assembling the disc and the rim with a precision comparable to their precision of manufacture has not yet been solved in a satisfactory and economical manner. As a matter of fact, as shown by experience, the defects observed on the finished wheels originate primarily upon the assembling. One harmful consequence of these defects is that the tire is not accurately centered on the axis of rotation of the wheel and exhibits an amount of wear and a behavior which may be abnormal.

SUMMARY OF THE INVENTION

An object of the present invention is to remedy the problems outlined above and in particular to provide a satisfactory solution to the problem of the precise positioning and assembling of the rim and the disc. More specifically it relates to a method which makes it possible:

To assemble with good precision the rim and the disc of a wheel for heavy vehicles, particularly in the case of a well-base rim with conical seats;

To establish the axis of rotation of the wheel in a position which practically coincides with the geometrical axis of the rim and that of the disc; and To protect the tire from harm due to any residual lack of precision in the assembling and centering of the disc and the rim.

Before completing the summary of the invention, it is advisable for the sake of clarity to give a few definitions. In the present specification and in the claims which follow it, the following definitions will be employed:

Axis of rotation (of the wheel): The axis of drilling of the central bore provided in the wheel disc and more precisely in the flat portion of the disc intended to bear against the hub;

Lateral run-out (of a circle represented physically on the rim or connected to the rim): The lack of perpendicularity of the plane of this circle with the axis of rotation of the wheel, the lateral run-out being measured by an axial distance;

Radial run-out (of a circle represented physically on the rim or connected to the rim): The difference of the distances from the axis of rotation of the wheel of the points of this circle located farthest from and closest to the axis of rotation, respectively;

Middle circle (of the rim): The imaginary circle on the rim lying in the plane of the intersection of the extensions of the conical surfaces which constitute the bead seats; the plane of the middle circle is thus the central plane of the conical seats since they have, in absolute value, the same inclination with respect to the axis.

In accordance with the invention, a wheel for heavy vehicles is manufactured. The wheel comprises a well-base rim, conical seats and a disc having a flat portion intended to bear against a hub and pierced by a central bore. The method is characterized in that:

a. Upon the manufacture of the rim a reference plane parallel to the plane of the middle circle is physically represented on the rim;

b. Upon the assembling of the rim and of the disc, parallelism of the reference plane with the flat portion of the disc is assured; and c. When, after the assembling of the rim and the disc, the central bore of the disc is produced, the axis of the bore is centered on the middle circle of the rim.

Preferably, there is physically represented on the rim not only the reference plane parallel to the plane of the middle circle but also a reference bore which is coaxial with the middle circle. This reference bore makes it possible, upon the assembling of the disc and the rim, roughly to effect the centering of the disc on the rim, this centering being then perfected when the central bore of the disc is made.

A rim in accordance with the invention, having a well base and two conical bead seats, is characterized in that it comprises, represented physically for example on one of the rim edges, a reference plane parallel to the plane of the middle circle of the rim.

Preferably a rim in accordance with the invention also has a reference bore coaxial with the middle circle.

A wheel in accordance with the invention having a well-base rim with conical seats which is assembled to a disc with a central bore defining the axis of rotation, is characterized in that the minimum radial run-out is located in the plane of the middle circle of the rim.

The physical representation on the rim of a reference plane parallel to the plane of the middle circle and possibly of a bore coaxial with the middle circle facilitates the precise positioning of the disc with respect to the rim and reduces the radial run-out resulting from an assembly skew of the disc on the rim. Furthermore, the centering of the axis of rotation, that is to say of the axis of the bore of the disc on the middle circle of the rim, makes it possible to reduce the radial run-out resulting from a defect in centering of the rim and the disc on the axis of rotation and furthermore reduces the effect of any residual radial run-out which one of the conical seats might have on the centering of the tire on the wheel. Calculation and experience show that if the rim is centered on the axis of the rotation by using one of the conical seats, the maximum radial run-out observed on the other conical seat is, for the same positioning error, twice that which is found in the case of centering on the middle circle--the tire is furthermore less well centered on the axis of rotation and its plane of symmetry is not identical with the plane of the middle circle.

BRIEF DESCRIPTION OF THE DRAWING

An understanding of other aspects of the invention may be gained from a consideration of the following detailed description of a representative embodiment thereof in conjunction with the appended figures of the drawing, wherein:

FIG. 1 is a view in axial half section of a finished wheel made in accordance with the invention;

FIG. 2 is an enlarged view of the portion of FIG. 1 included within a circle, in order better to show a reference plane and bore provided in accordance with the invention;

FIG. 3 is a view in axial section through a rim in accordance with the invention, arranged on a machine, shown schematically, for producing the reference plane and bore respectively parallel to and coaxial with the middle circle;

DESCRIPTION OF THE PREFERRED EMBODIMENT

Figure 4:
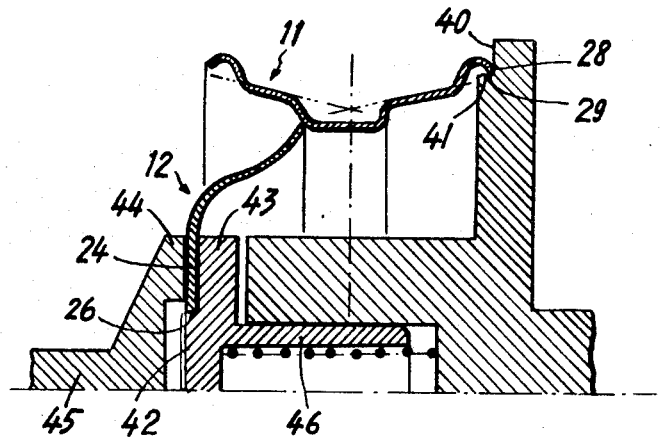
FIG. 4 is a view in axial half section of a wheel in accordance with the invention, the rim and the disc being shown in the course of assembly on the assembling machine, which is indicated schematically.

While in all the figures the axis of rotation of the wheel has been shown horizontal, some or all of the operations in accordance with the invention can also be effected when the axis of the wheel is vertical or oriented in some other manner. This is true in particular of the operations illustrated in FIGS. 4–6, which may well be performed when the axis of the wheel is vertical.

FIG. 1 shows a wheel 10 having a rim 11 and a disc 12. The rim 11 comprises a well base 14, two conical bead seats 15 and 16 inclined at an angle $\alpha$ of 15° with respect to the axis of the wheel, and two curved-in beads 17 and 18. The conical surfaces of the bead seats 15 and 16 intersect at a circle 19' which defines a plane 19. The plane 19 in turn intersects the rim 11 at a circle 19'', which is defined as the middle circle of the rim. The plane 19 of the middle circle of the rim and the middle circle itself are equidistant from the planes of the circles 20 and 21 which are delimited by the junction of the rim edges 17 and 18 and the conical seats 15 and 16, respectively.

The disc is welded to the rim at 22 and near the rim has a curved portion 23 which is followed by a flat portion 24 intended to rest against the hub and fasten the wheel by means of holes 25 and bolts and nuts (not shown). The disc has a central bore 26 which defines the axis of rotation 27 of the wheel, and the holes 25 which effect the fastening of the wheel on the hub are equidistant from the axis 27. The centering of the wheel on the hub is assured by the bore 26, but it could also be assured by the holes 25 equidistant from the bore.

As shown in FIG. 2, the rim 11 comprises, on the bead 18, a reference plane 28 which is machined parallel to the plane 19 of the middle circle 19'', as well as a bore 29 which is machined coaxially with the middle circle.

Furthermore, in accordance with the invention, the minimum radial run-out of the rim is located in the plane 19 of the middle circle. In other words, the middle circle has a smaller radial run-out than any circle parallel thereto outside of the plane 19 and lying in the rim. Thus the intersection, not physically represented, of the conical surfaces of the seats 15 and 16 defines the region of the rim best centered on the axis of rotation 27 of the wheel. This arrangement has the advantage of assuring the best centering and the best positioning of the tire with respect to the axis of rotation 27 of the wheel and the middle plane 19 or plane of the middle circle of the rim.

In FIG. 3 there is shown a rim 11 arranged on a machine for forming the reference plane 28 and reference bore 29.

The rim 11 is grasped between two coaxial frustoconical plates 31 and 32. The frustoconical surfaces of the plates are inclined on their common axis 30 by an angle of 15° equal to the angle of inclination $\alpha$ for the conical seats 15 and 16 of the rim.

The plates 31 and 32 are brought against each other with sufficient force to embed themselves in the rim, center the latter on the axis 30 and possibly straighten the shape of the conical seats of the rim. In final position of the plates 31 and 32, the middle circle of the rim, which lies in the plane 19, is necessarily centered on the axis 30. One can of course provide either that both plates 31 and 32 are movable along the axis or that one is movable and the other fixed.

After the centering of the rim on the plates 31 and 32, the latter are placed in simultaneous synchronous rotation by means of the spindles 33 and 34. Two tool-holding carriages 35 and 36 make it possible to effect with one of them the dressing of the reference plane face 28 and with the other the drilling of the bore of the cylindrical reference surface 29.

The face 28 is parallel to the plane 19 and the bore 29 is coaxial with the middle circle 19'', provided that the tool-holding carriages 35 and 36 move, by construction of the machine, only perpendicular or parallel to the axis 30, as indicated by the arrows 35' and 36'.

In FIG. 4 there is shown the positioning, for their assembling, of the disc 12 and the rim 11.

The rim 11 is arranged in such a manner that its flat reference face 28 is applied against the well-dressed flat surface 40. A shoulder 41 of the same diameter as the bore 29 preferably permits centering the rim.

Between two plates 43 and 44 having flat bearing surfaces parallel to the plane 40, there is arranged the flat portion 24 of a disc 12. The disc 12 is approximately centered by means of a pre-bore 26 which fits in the shoulder 42. The disc is locked by clamping between the plates 43 and 44 in a position such that its portion 24 is parallel to the plane 40 and therefore to the reference face 28 on the rim.

In this position one effects either the partial assembling of the disc and the rim by means of a few spots of weld or the final assembling by means of weld beads.

Figure 5:
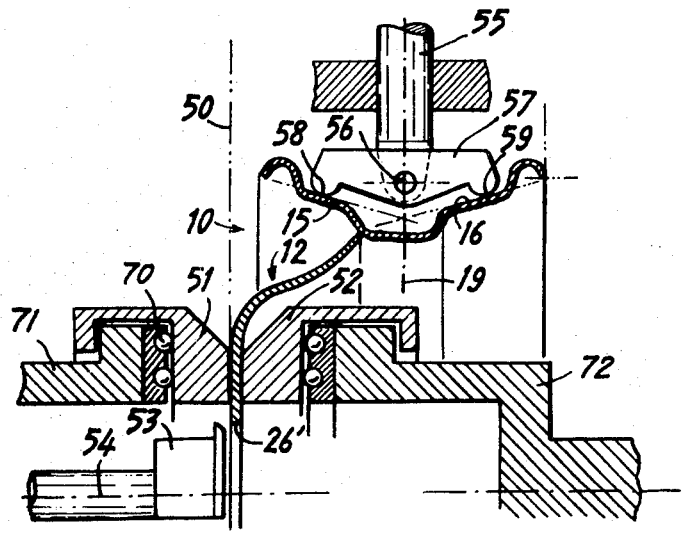
FIG. 5 is a view in axial half section through a wheel in accordance with the invention, arranged on the machine which effects the centering of the wheel on the axis of rotation and drills in the disc the central bore which materially represents the axis of rotation of the wheel.

In FIG. 5 there is shown the production of the central bore 26 in the disc, which bore physically represents the axis of rotation of the wheel.

The wheel 10 is held between two plates 51 and 52, which clamp its disc 12. These plates are capable of sliding parallel to the plane 50 by the interpositioning of ball bearings 70 between them and their supports 71 and 72.

The installation comprises a boring head 53, the axis of rotation 54 of which is fixed and perpendicular by construction to the plane 50, and is intended to produce the final bore 26'.

In order to center the wheel on the axis 54, three arms 55 are provided--only one of which is shown, which are placed around the axis 54 at intervals of 120°. Each arm has at its end a template 57 pivoted around a pin 56 parallel to the plane 50. Each template 57 is provided with two stops 58 and 59 equidistant from the pin 56 and intended to come against the conical seats 15 and 16 of the rim 11. The three arms 55 are capable of radial displacement by means of any suitable mechanism (not shown) so that the pins 56 remain at all times equidistant from the axis 54 and at a distance from the plane 50 corresponding to the position of the plane of the middle circle 19.

The wheel 10 having been placed and being held fast by the sliding plates 51 and 52, the arms 55 are brought towards the axis 54. The arms 55 enter successively into contact with the rim 11 via the stops 58 and 59 and displace the assembly formed by the wheel and the plates 51 and 52, until locking. Upon locking, the pins 56 located in the plane 19 of the middle circle of the rim are equidistant from the axis 54 and the middle circle of the rim 11 is then centered on the axis 54. The final bore 26' is then produced, the axis 54 of which defines the axis of rotation of the wheel.

Figure 6:
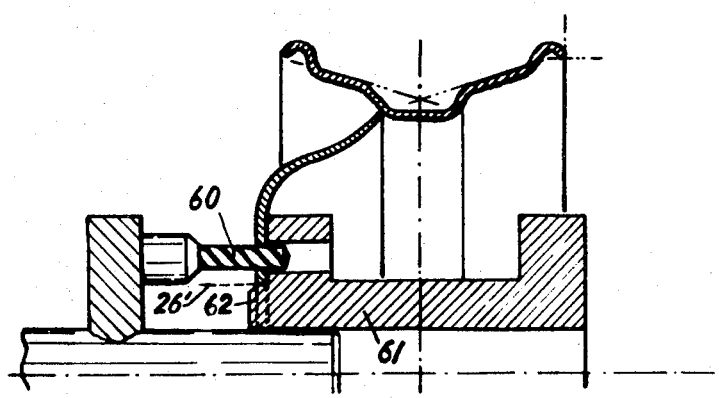
FIG. 6 is a view in axial half section of a wheel in accordance with the invention, arranged on the machine for effecting the drilling of the attachment holes in the disc.

FIG. 6 shows the piercing of the wheel to form the attachment holes 25 (FIG. 1) by means of a multiple-spindle machine 60. The wheel is centered on the machine by its bore 26' which is engaged in a corresponding bearing 62 of the wheel support 61.

Thus there are provided in accordance with the invention a novel and highly effective wheel and rim and method for their manufacture. Many modifications of the representative wheel, rim and method disclosed herein will readily occur to those skilled in the art. Accordingly, the invention is to be construed as including all the embodiments thereof within the scope of the appended claims.

I claim:

1. In a method of manufacturing a wheel for heavy vehicles wherein the wheel includes a well-base rim formed with conical bead seats, a disc formed with a flat central portion intended to bear against a hub and with a central bore, and a middle circle defined by the intersection of the rim and the plane of intersection of the conical surfaces of said bead seats, the improvement comprising the steps of
    a. forming on said rim a surface lying in a reference plane parallel to the plane of said middle circle;
    b. forming an assembly of said disc and said rim with said reference plane parallel to said flat portion of said disc; and
    c. forming a central bore in said disc concentric with said middle circle of said rim.

2. A method according to claim 1 comprising the step of forming a reference bore in the rim, said reference bore being coaxial with said middle circle.

3. A method according to claim 2 comprising the step of providing a pair of frustoconical plates formed with inclinations equal to the inclinations of said bead seats, pressing said plates respectively against said bead seats from opposite sides to grip said bead seats securely, effecting rotation of said plates and said rim, and forming said reference plane and said reference bore simultaneously with said rotation.

4. A method according to claim 1 wherein the forming of said central bore in said disc comprises the steps of providing a pair of plates movable in a direction perpendicular to the axis of rotation of said wheel, grasping said wheel by means of said plates from opposite sides thereof, providing a plurality of arms around the circumference of said wheel, said arms being equidistant from the axis of said wheel, adjusting the position of said wheel by moving said arms radially against said wheel while maintaining said arms equidistant from the axis of rotation of said wheel, and forming said central bore while said wheel is so held by said arms.

* * * * *